: US006327111B1

United States Patent
Heath et al.

(10) Patent No.: US 6,327,111 B1
(45) Date of Patent: Dec. 4, 2001

(54) SYSTEM FOR REDUCING CONTROLLER DELAYS DURING SEQUENTIAL DATA TRANSFERS IN A DISC DRIVE

(75) Inventors: Mark Alan Heath; John Garrett Lingo, both of Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 08/276,154

(22) Filed: Jul. 15, 1994

(51) Int. Cl.[7] ................................................. G11B 5/596
(52) U.S. Cl. ...................................... 360/78.04; 360/77.02
(58) Field of Search .............................. 360/78.04, 77.02, 360/75, 49; 395/425, 438, 439

(56) References Cited

U.S. PATENT DOCUMENTS 4,396,961 * 8/1983 Prasad et al. ...................... 360/78.04
4,803,572 * 2/1989 Haruna et al. .................. 360/78.04 X

FOREIGN PATENT DOCUMENTS

0540114 * 5/1993 (EP) .................................. 360/78.04

* cited by examiner

*Primary Examiner*—Andrew L. Sniezek
(74) *Attorney, Agent, or Firm*—Joseph R. Kelly; Westman, Champlin & Kelly, P.A.

(57) ABSTRACT

A system for controlling movement of a head over tracks on a disc in a disc drive includes a servo positioner for positioning the head over a desired track, a sectoring circuit for determining when the head is over a data sector on the desired track, a formatter for controlling data transfers to and from the desired track, and a controller for providing the servo positioner with a track address indicative of the desired track. A track change system is coupled to the formatter and the servo positioner, and provides a direct communication channel between the servo positioner and the formatter. Thus, the data transfer can be carried out utilizing communications between the formatter and the servo positioner, without waiting for the microcontroller to be interrupted.

15 Claims, 5 Drawing Sheets

SYSTEM FOR REDUCING CONTROLLER DELAYS DURING SEQUENTIAL DATA TRANSFERS IN A DISC DRIVE

BACKGROUND OF THE INVENTION

The present invention deals with disc drives. More specifically, the present invention deals with a system for reducing controller delays during sequential data transfers in a disc drive.

A typical magnetic disc drive includes one or more magnetic discs, a transducer supported by a hydrodynamic air bearing which flies above each magnetic disc, and a drive controller for controlling the disc drive based on commands received from a host system. The drive controller controls the disc drive to retrieve information from the magnetic discs and to store information on the magnetic discs.

An electromechanical actuator operates within a negative feedback, closed-loop servo system (the servo positioning system). The actuator moves the transducer radially over the disc surface for track seek operations and holds the transducer directly over a track on the disc surface for track following operations.

Information is typically stored on the magnetic discs by providing a write signal to the transducer to encode flux reversals on the surface of the magnetic disc representing the data to be stored. In retrieving data from the disc, the drive controller controls the electromechanical actuator so that the transducer flies above the magnetic disc, sensing the flux reversals on the magnetic disc and generating a read signal based on those flux reversals. The read signal is then decoded by the drive controller to recover the data represented by flux reversals stored on the magnetic disc, and consequently represented in the read signal provided by the transducer.

Conventionally, the electromechanical actuator includes an actuator arm assembly which is coupled to a head gimbal assembly (which includes the transducer and hydrodynamic air bearing). The actuator arm assembly is controlled to pivot about a pivot point to move the head gimbal assembly over the surface of the disc to a desired radial position. The actuator arm assembly typically includes an actuator arm and a voice coil which is connected to the actuator arm. A magnet, or group of magnets, is positioned relative to the voice coil such that when the disc drive controller causes current to flow through the voice coil, the fields generated by the voice coil interact with the magnetic field provided by the magnets to cause movement of the actuator arm assembly about the pivot point.

In addition to the servo positioning system, typical disc drives include a disc formatter, sectoring logic and a microcontroller. The disc formatter is responsible for transferring data to or from the magnetic disc and the sectoring logic informs the disc formatter when a data sector is positioned under the transducer (or head) so that the data transfer may begin. The servo positioning system, as discussed above, is responsible for positioning the transducer over the proper data track. The microcontroller coordinates data transfers by communicating with the disc formatter and the servo positioning system.

A sequential data transfer is a transfer in which data is either read from, or written to, a plurality of tracks on the disc. Conventional methods of accomplishing a sequential data transfer include the microcontroller first determining a servo destination which identifies the track over which the data transfer is to start. The microcontroller then controls the servo positioning system to initiate positioning of the head over the desired track. After positioning is complete, the servo positioning system indicates that the head is over the appropriate track. Then, the controller causes the disc formatter to begin the data transfer. After the data transfer is complete, the controller determines whether additional data is to be transferred to a different track. If so, the controller indicates to the servo positioning system the next track to which data is to be transferred (i.e., the controller indicates the next track to which data is to be written or from which data is to be read). The process repeats itself until no more data is to be transferred at which point the data transfer is completed.

In such a conventional system, the controller must wait for the disc formatter to reach the end of a track before instructing the servo positioning system to move the head to another track. In addition, the controller must wait for the servo positioning system to indicate that the head has been moved before instructing the disc formatter to resume the data transfer. Due to the controller overhead involved in performing these two tasks, the controller delays consequent to the track change operation take significantly longer than the actual mechanical operation of moving the head. This problem is exacerbated in systems in which the controller is responsible for additional tasks. For example, the controller may be slow to respond to an end-of-track indication from the disc formatter because the controller is busy coordinating other disc drive operations.

These delays are further exacerbated by the fact that the servo positioning system and the disc formatter typically provide signals indicating that the head is over the proper track, and that the head has reached the end of a track, respectively, as controller interrupts to the system controller. In such systems, the controller may typically disable certain interrupts while it is performing a number of other tasks. Thus, the interrupts provided from the disc formatter and the servo positioning system may be disabled, and the controller delay is consequently lengthened.

SUMMARY OF THE INVENTION

A system controls positioning of a head over tracks on a disc in a disc drive. The system includes a servo positioner for positioning the head based on the destination signal indicating a destination track, and providing a servo complete signal upon positioning the head over the destination track. A formatter transfers data to and from the disc and provides a track complete signal indicating when the head is at an end of the current track. A controller provides the destination signal to the servo positioner, and a track changer provides a communication channel, other than the controller, between the formatter and the servo positioner to reduce controller delays in transferring data.

DETAILED DESCRIPTION OF THE PREFERRED EMBODIMENTS

Figure 1:
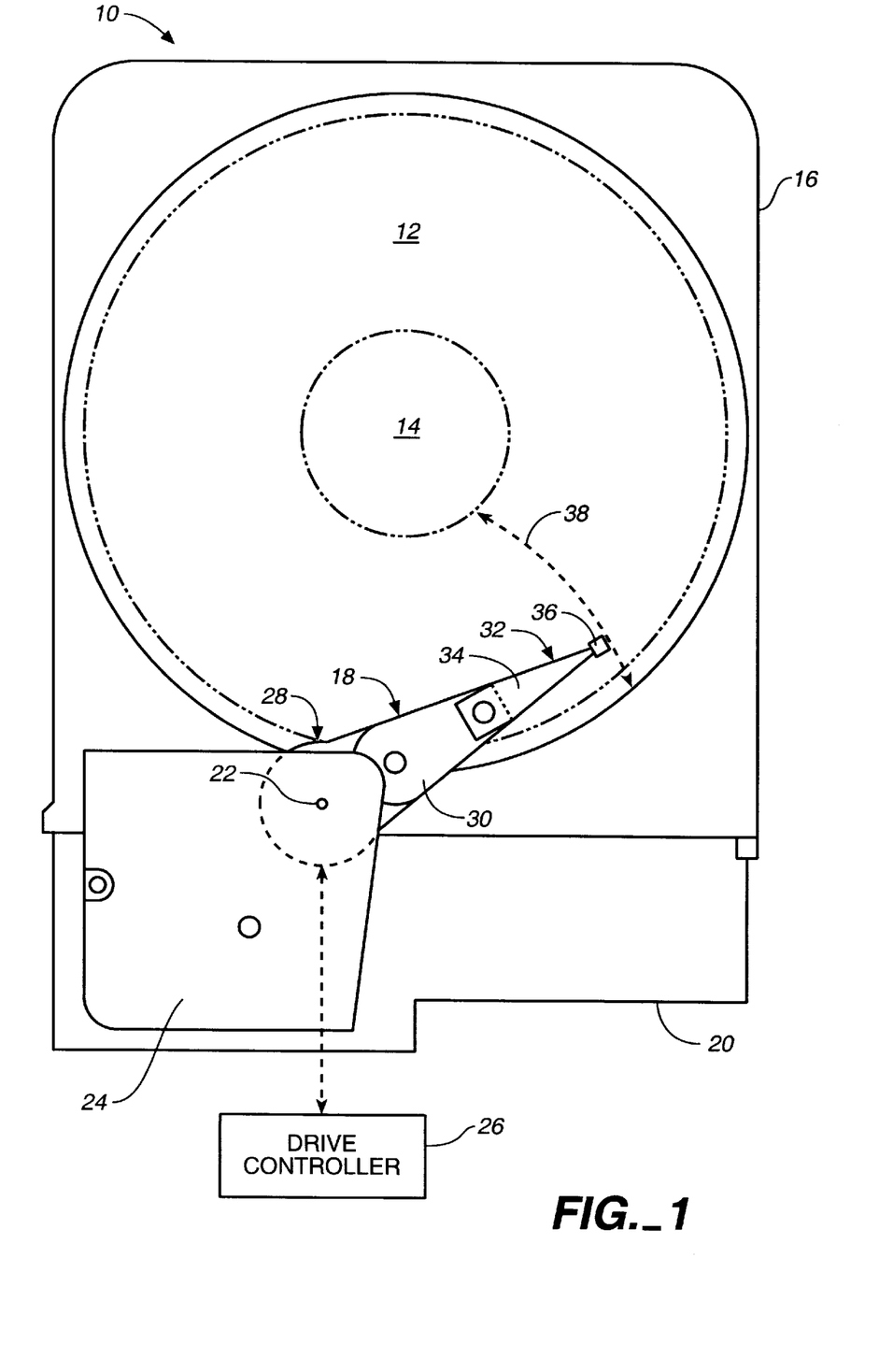
FIG. 1 is a top view of a disc drive.

FIG. 1 is a top view of a disc drive 10 of the present invention. Disc drive 10 includes a magnetic disc 12 mounted for rotational movement about an axis defined by spindle 14 within housing 16. Disc drive 10 also includes an actuator system 18 mounted to a base plate 20 of housing 16 and pivotally movable relative to disc 14 about axis 22.

A cover 24 covers a portion of actuator system 18. Drive controller 26 is coupled to actuator system 18. In the preferred embodiment, drive controller 26 is either mountable within disc drive 10, or is located outside of disc drive 10 with suitable connection to actuator system 18.

In a preferred embodiment, actuator system 18 includes an actuator arm assembly 28, a rigid support member 30, and a head gimbal assembly 32. Head gimbal assembly 32 includes a load beam or flexure arm 34 coupled to rigid member 30, and a hydrodynamic air bearing (a slider) coupled by a gimbal (not shown) to load beam 34. Slider 36 supports a transducer (or multiple transducers) or head for reading information from disc 12 and encoding information on disc 12.

During operation, drive controller 26 receives position information indicating a portion of disc 12 to be accessed. Drive controller 26 receives the position information from an operator, from a host computer, or from another suitable controller. Based on the position information, drive controller 26 provides a position or destination signal to actuator system 18. The position signal causes actuator system 18 to pivot or rotate about axis 22. This, in turn, causes slider 36 (and consequently the head mounted on slider 36) to move radially over the surface of disc 12 in a generally arcuate path indicated by arrow 38. Drive controller 26 and actuator system 18 operate in a known closed loop, negative feedback manner so that the head carried by slider 36 is positioned over the desired track of disc 12. Once the head is appropriately positioned, drive controller 26 then controls execution of a desired read or write operation.

During a sequential data transfer, data to be transferred relative to a track on disc 12 (either to the track or from the track) typically involves more than one track. In such a transfer, drive controller 26 must control actuator system 18 to pivot to a first track, execute a portion of the data transfer, then pivot to a subsequent or next track and execute the remainder of the data transfer. In some instances, data must be transferred to yet another track. In such an instance, disc drive controller 26 causes actuator system 18 to move to the next track and execute the remainder of the data transfer.

Figure 2:
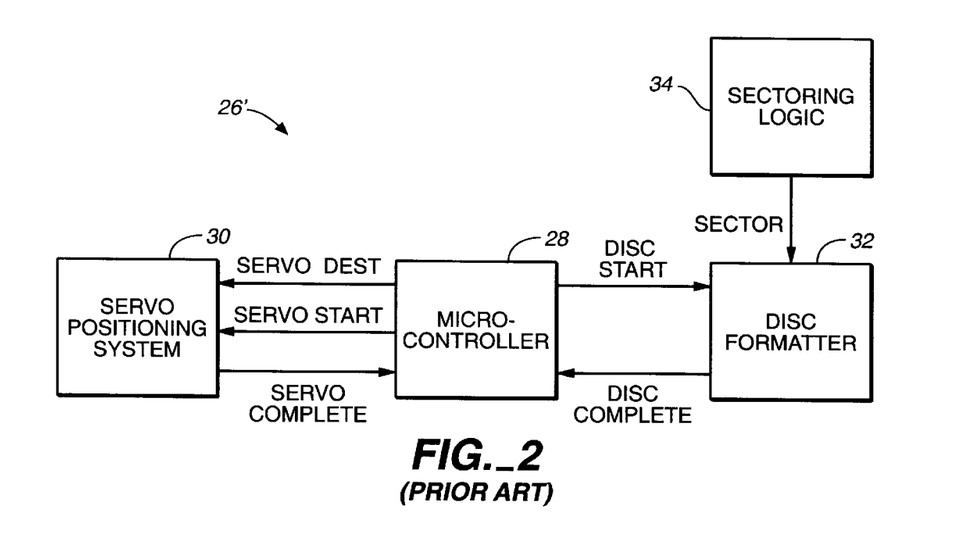
FIG. 2 is a system level block diagram of a traditional disc drive controller system.

FIG. 2 is a system level, functional block diagram of drive controller 26' according to the prior art. Controller 26' includes microcontroller 28, servo positioning system 30, disc formatter 32, and sectoring logic 34. Microcontroller 28 is coupled to servo positioning system 30 and disc formatter 32. Disc formatter 32, in turn, is coupled to sectoring logic 34.

Disc formatter 32 transfers data to or from the disc. Sectoring logic 34 informs disc formatter 32 when a data sector is positioned under the head. Servo positioning system 30 mechanically positions the head over the proper data track, and microcontroller 28 coordinates data transfers by communicating with disc formatter 32 and servo positioning system 30.

Figure 3:
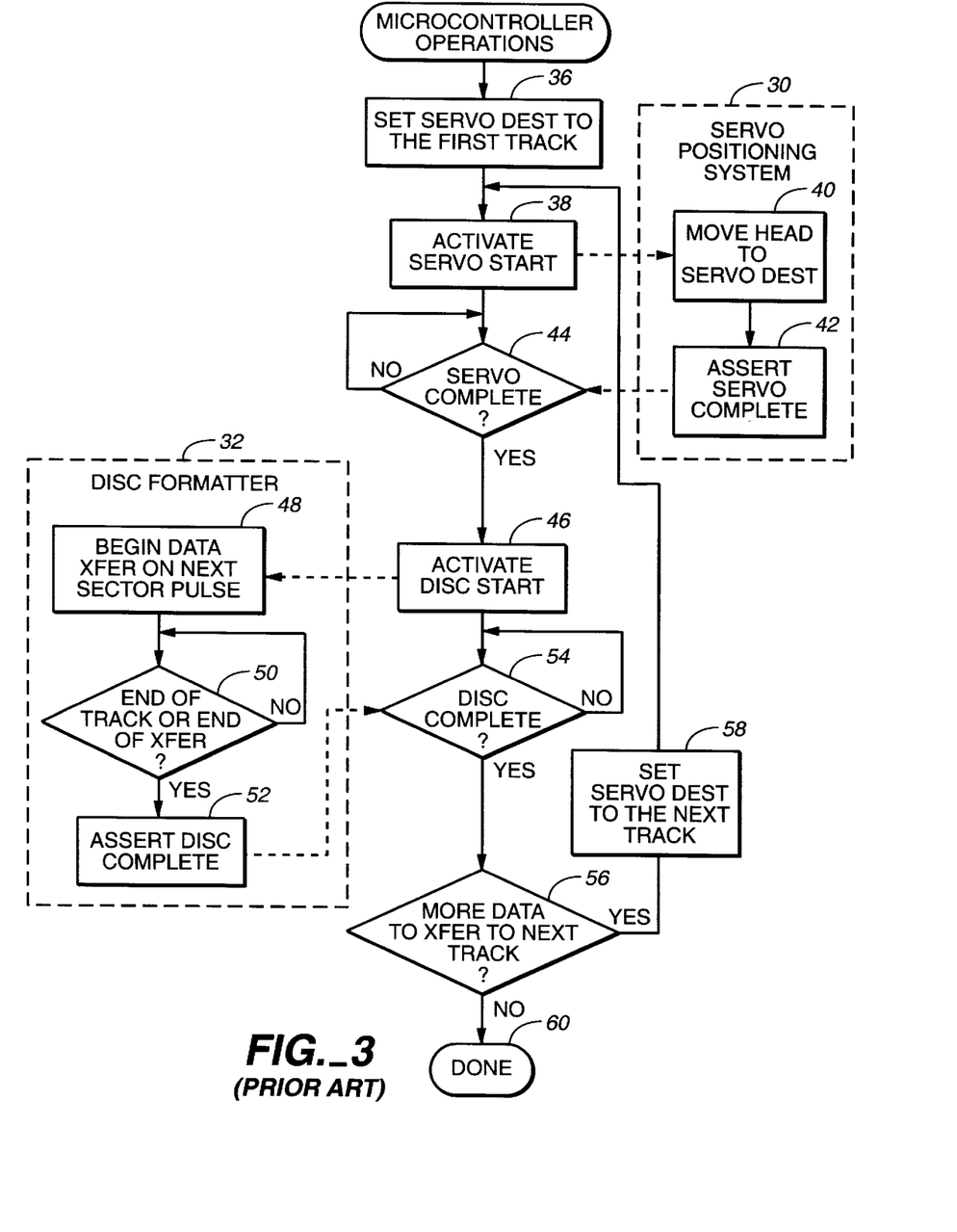
FIG. 3 is a flow diagram showing a sequential data transfer according to the prior art, as executed by the system shown in FIG. 2.

The operation of drive controller 26' can best be understood with reference to the flow diagram shown in FIG. 3. FIG. 3 contains certain terms which, for the sake of the present description, are defined as follows:

SECTOR is a signal generated by sectoring logic 34 to indicate when a data SECTOR is positioned under the head. The SECTOR signal is only provided when the head is positioned over the correct track.

DISC START is a signal provided by microcontroller 28 to instruct disc formatter 32 to begin (or resume) the disc transfer on the next SECTOR pulse.

DISC COMPLETE is a signal provided by disc formatter 32 to indicate to microcontroller 28 that the disc transfer has either been completed, or that the head has reached the end of a track on the disc.

SERVO DEST is a signal provided by microcontroller 28 to supply a destination (or position) to servo positioning system 30. The position or destination is the radial position above the disc (corresponding to a desired track) at which servo positioning system 30 is to position the head.

SERVO START is a signal provided by microcontroller 28 to instruct servo positioning system 30 to move the head to the position specified by the SERVO DEST signal.

SERVO COMPLETE is a signal provided by servo positioning system 30 indicating to microcontroller 28 that the head has been positioned in the radial position indicated by the SERVO DEST signal.

FIG. 3 shows that microcontroller 28 first sets the SERVO DEST signal to a first track and provides the SERVO DEST signal to servo positioning system 30 indicating the track at which the data transfer is to begin. This is indicated by block 36. Microcontroller 28 then provides the SERVO START signal to servo positioning system 30. This is indicated by block 38.

Servo positioning system 30 then begins moving the head to the track indicated by the SERVO DEST signal. As soon as servo positioning system 30 has moved the head to the track identified by the SERVO DEST signal, servo positioning system 30 provides the SERVO COMPLETE signal to microcontroller 28. This is indicated by blocks 40 and 42.

After receiving the SERVO COMPLETE signal, microcontroller 28 provides the DISC START signal to disc formatter 32. This is indicated by blocks 44 and 46.

Disc formatter 32, after receiving the DISC START signal from microcontroller 28, begins (or resumes) the data transfer upon receiving the next SECTOR pulse from sectoring logic 34 indicating that a data sector is beneath the head. This is shown by block 48. Disc formatter 32 continues to transfer data until either the end of the present track is reached, or the end of the data transfer is reached. Once either of these conditions is reached, disc formatter 32 provides the DISC COMPLETE signal to microcontroller 28. This is indicated by blocks 50 and 52.

Upon receiving the DISC COMPLETE signal from disc formatter 32, microcontroller 28 determines whether additional data needs to be transferred in the present data transfer relative to another track. This is indicated by blocks 54 and 56. If so, microcontroller 28 sets the SERVO DEST signal to the next track to which (or from which) data is to be transferred, and provides the SERVO DEST signal to servo positioning system 30. Microcontroller 28 again activates the SERVO START signal and provides it to servo positioning system 30, and the data transfer sequence starts anew. This is indicated by blocks 58 and 38.

If no additional data is to be transferred with the present data transfer operation, microcontroller 28 exits the data transfer sequence to perform other tasks. This is indicated by block 60.

It can thus be seen that microcontroller 28 must wait for disc formatter 32 to reach the end of a track before providing servo positioning system 30 with the destination of the next track. In addition, microcontroller 28 must wait for servo positioning system 30 to indicate that the head has been moved to the appropriate track before instructing disc formatter 32 to resume the data transfer operation. Since the SERVO COMPLETE signal from servo positioning system 30, and the DISC COMPLETE signal from disc formatter 32 are typically provided to microcontroller 28 in the form of interrupts, the microcontroller overhead involved in performing the track change operation can take a significant amount of time. In fact, the microcontroller track change operation takes significantly longer than the actual mechanical operation of moving the head. This time can even be lengthened when microcontroller 28 is busy performing other disc drive operations which require the interrupts to be temporarily disabled.

Figure 4:
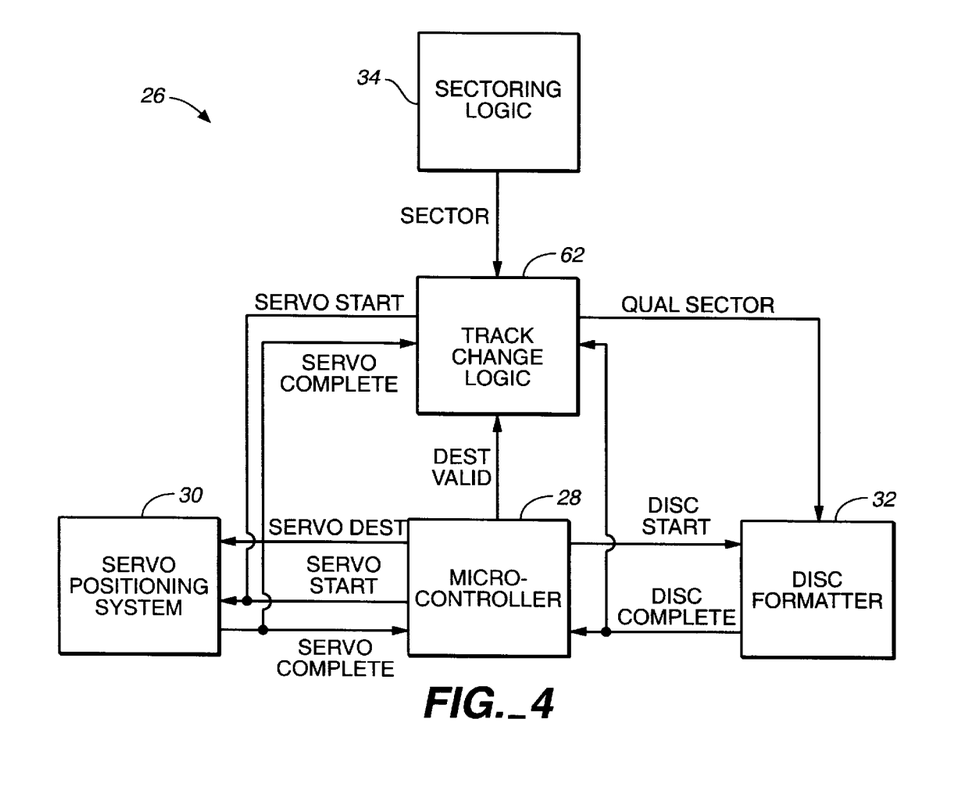
FIG. 4 is a system level functional block diagram of a disc drive control system according to the present invention.

FIG. 4 is a system level functional block diagram of disc drive controller 26 according to the present invention. Similar items are similarly numbered to those shown in FIG. 2. However, disc drive controller 26 includes track change logic 62.

Track change logic 62 provides a communication channel, separate from microcontroller 28, between servo positioning system 30 and disc formatter 32. Track change logic 62 is also provided with the DISC COMPLETE signal from disc formatter 32 as well as the SERVO COMPLETE signal from servo positioning system 30.

Since track change logic 62 provides a communication channel, separate from microcontroller 28, between disc formatter 32 and servo positioning system 30, a number of the communication tasks between servo positioning system 30 and disc formatter 32 can be accomplished, through simple logic gates in track change logic 62, without involving microcontroller 28. This significantly reduces the overhead of microcontroller 28 in data transfer operations. Thus, by providing track change logic 62, the amount of time required to change tracks during a sequential data transfer is significantly reduced.

All of the signals in FIG. 4 have the same function as described with respect to FIGS. 2 and 3, except that FIG. 4 contains two new signals, the DEST VALID signal and the QUAL SECTOR signal. The DEST VALID signal is provided by microcontroller 28 to inform track change logic 62 that the SERVO DEST signal provided to servo positioning system 30 is valid. The DEST VALID signal synchronizes the operation of track change logic 62 with that of microcontroller 28. Microcontroller 28 must supply a SERVO DEST signal to servo positioning system 30 before a SERVO START signal is generated by track change logic 62. The DEST VALID signal is cleared by the track change logic 62 whenever track change logic 62 activates the SERVO START signal.

Track change logic 62 receives the SECTOR signal from sectoring logic 34 and provides the SERVO START signal to servo positioning system 30, and also provides the QUAL SECTOR signal to disc formatter 32. The QUAL SECTOR signal is essentially the SECTOR signal provided by sectoring logic 34 qualified by track change logic 62. The QUAL SECTOR signal is off if the SERVO START signal has been provided, but the corresponding SERVO COMPLETE signal has not been received by track change logic 62. Otherwise, the QUAL SECTOR signal reflects the state of the SECTOR signal provided by sectoring logic 34. The QUAL SECTOR signal is provided by track change logic 62 to inform the disc formatter 32 that the head has been positioned on the correct track and that a data sector is under the head.

Figure 5A:
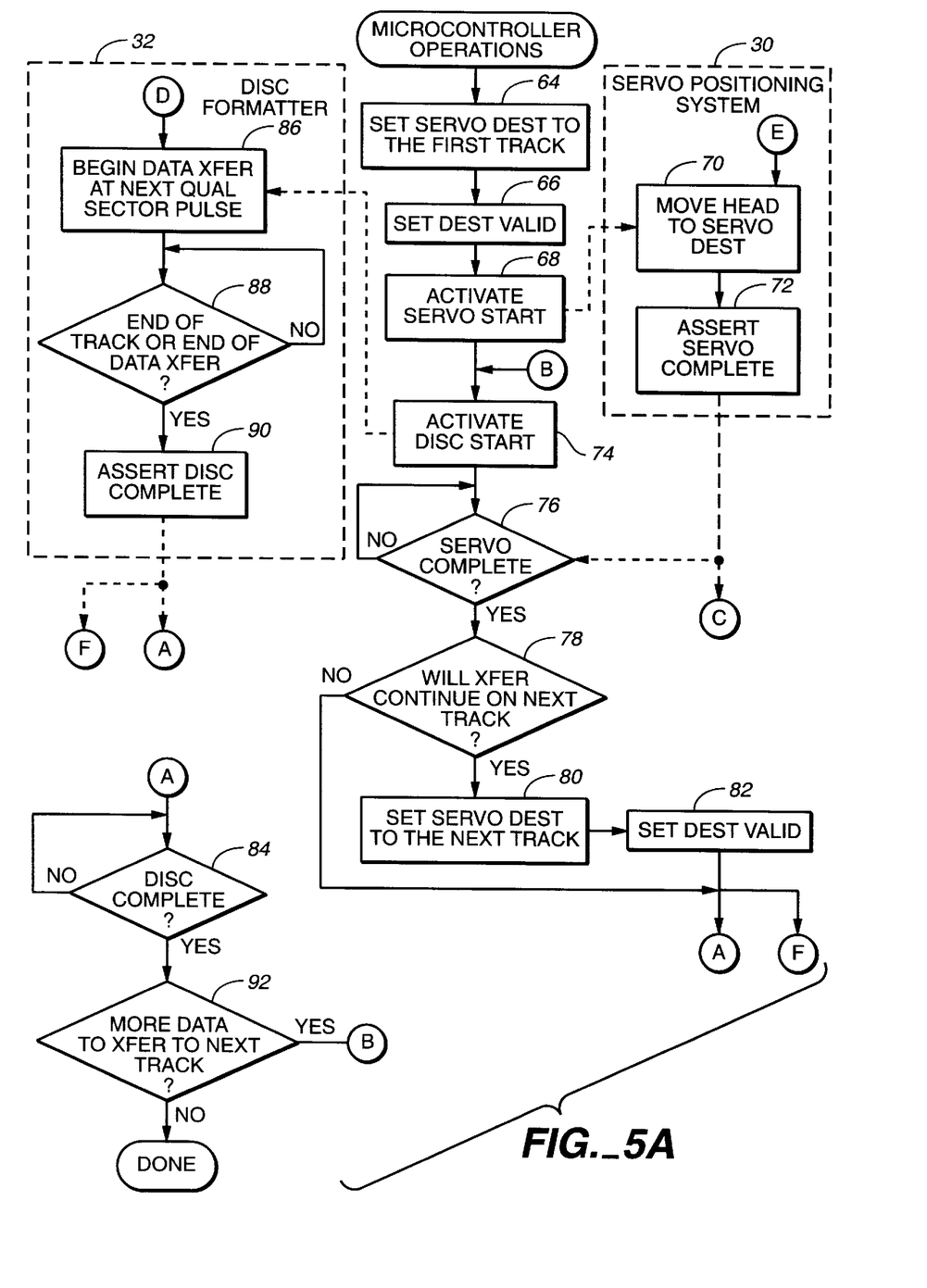
FIGS. 5A and 5B show a flow diagram of a sequential data transfer as executed by the system shown in FIG. 4.
Figure 5B:
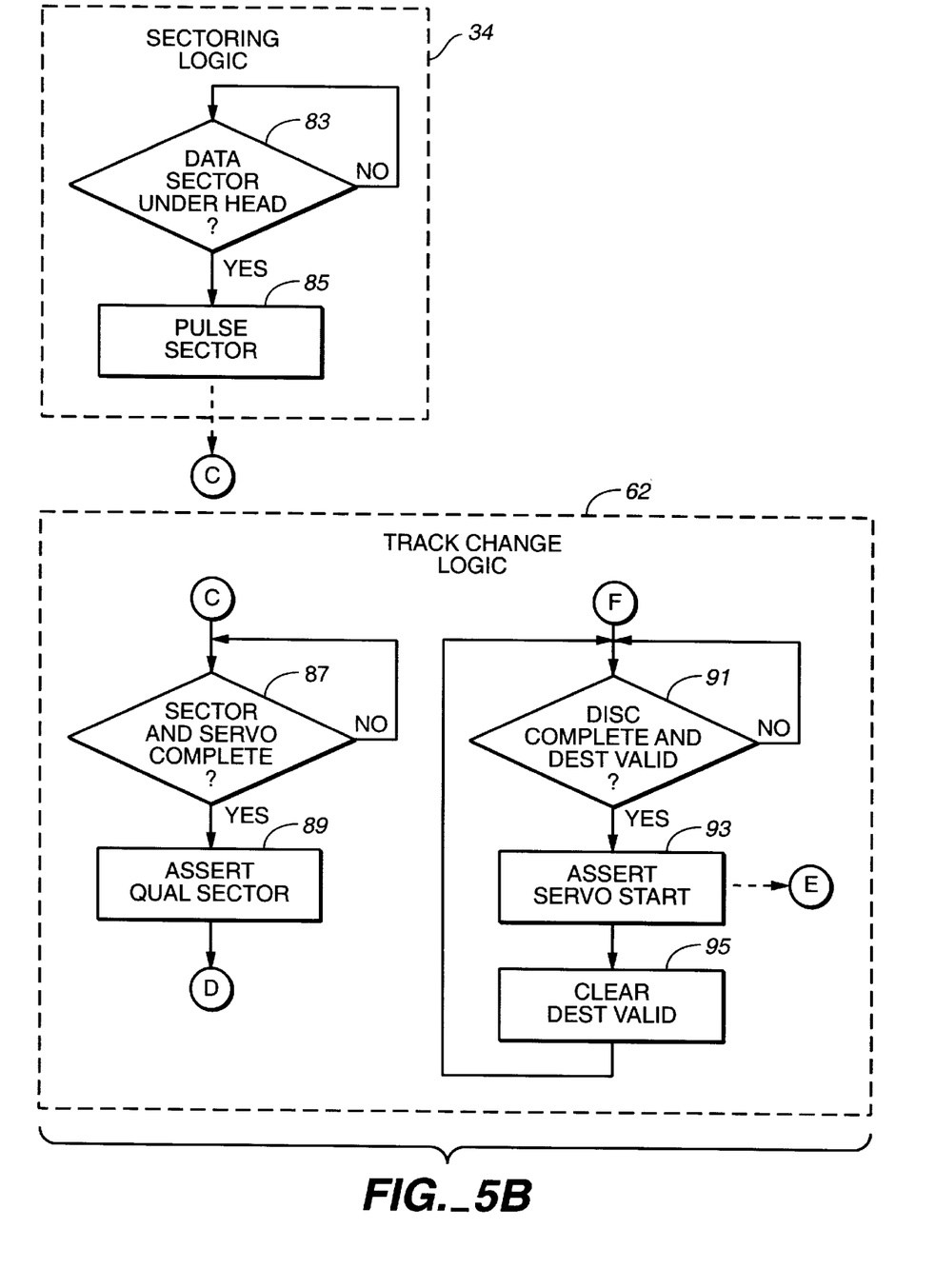

The operation of track change logic 62 in disc drive controller 26 can better be illustrated with reference to FIGS. 5A and 5B. Microcontroller 28 initially sets the SERVO DEST signal to indicate the first track of the data transfer. Microcontroller 28 then sets the DEST VALID signal and provides it to track change logic 62 to synchronize operation of track change logic 62 with microcontroller 28. These operations are indicated by blocks 64 and 66. Microcontroller 28 then activates the SERVO START signal and provides it to servo positioning system 30. This is indicated by block 68.

Servo positioning system 30 begins moving the head to the track identified by the SERVO DEST signal. Once the head has been moved to the desired track, servo positioning system 30 asserts the SERVO COMPLETE signal and provides it to microcontroller 28 and track change logic 62. This is indicated by blocks 70 and 72.

While servo positioning system 30 is positioning the head over the desired track, microcontroller 28 provides the DISC START signal to disc formatter 32. This is indicated by block 74. Microcontroller 28 then waits to receive the SERVO COMPLETE signal from servo positioning system 30, indicating that the head is now located over the desired track. This is indicated by block 76.

Once microcontroller 28 has received the SERVO COMPLETE signal, microcontroller 28 determines whether the data transfer will continue on a next track. This is indicated by block 78. If so, microcontroller 28 sets the SERVO DEST signal to identify the next track, again sets the DEST VALID signal to synchronize the operation of track change logic 62 and microcontroller 28, and waits until the data transfer is complete. This is indicated by blocks 80, 82 and 84.

If the data transfer will not continue onto a next track, microcontroller 28 simply waits until the data transfer is complete (i.e., microcontroller 28 waits to receive the DISC COMPLETE signal from disc formatter 32). This is indicated by block 84.

After disc formatter 32 receives the DISC START signal from microcontroller 28, disc formatter 32 is initialized to begin (or resume) a data transfer upon receiving the QUAL SECTOR signal from track change logic 62. The QUAL SECTOR signal indicates that the head is over the correct track and that a data sector is under the head and is provided by track change logic 62 after receiving the SERVO COMPLETE signal and the SECTOR pulse. This is indicated by blocks 83, 85, 86, 87 and 89. Disc formatter 32 continues to transfer data until either the head reaches the end of the track relative to which data is currently being transferred, or until the end of the data transfer. In either case, disc formatter 32 asserts the DISC COMPLETE signal and provides it to microcontroller 28 and track change logic 62. These operations are indicated by blocks 88 and 90.

Upon receiving the DISC COMPLETE signal and the DEST VALID signal, track change logic 62 provides the SERVO START signal to servo positioning system 30 causing servo positioning system 30 to move the head to the next track identified by the SERVO DEST signal. Track change logic 62 also clears the DEST VALID signal. This is indicated by blocks 91, 93 and 95. During movement of the head to the next track, microcontroller 28 again provides the DISC START signal to disc formatter 32 and awaits the SERVO COMPLETE signal. This process continues until there is no additional data to be transferred. At that point, microcontroller 28 exits the data transfer sequence. This is indicated by block 92.

Thus, disc drive controller 26 of the present invention eliminates significant microcontroller delays during the track change operation by creating a communications channel between disc formatter 32 and servo positioning system 30 in the form of track change logic 62. After starting a disc transfer, microcontroller 28 informs the servo positioning system 30 where to position the head for next track, but servo positioning system 30 does not move the head until instructed to do so by track change logic 62. When disc formatter 32 reaches the end of the current track, it informs both track change logic 62 and microcontroller 28 of the end-of-track condition. Track change logic 62 responds disabling the QUAL SECTOR signal and instructing servo positioning system 30 to move the head to the next track position previously loaded by microcontroller 28. Microcontroller 28 responds to the end of track condition by instructing disc formatter 32 to resume data transfer when the QUAL SECTOR input is activated.

After the head has been repositioned, servo positioning system 30 informs track change logic 62 and microcontroller 28 that the head has been moved to the new position. Track change logic 62 responds by reenabling the QUAL SECTOR output which allows disc formatter 32 to continue the data transfer. Microcontroller 28 informs servo positioning system 30 where to position the head for the next track. Again, servo positioning system 30 waits until track change logic 62 indicates that disc formatter 32 has reached an end of track before moving the head to its new, next track location.

Track change logic 62 can be implemented with simple digital logic gates. Thus, the communication delay between servo positioning system 30 and disc formatter 32 is on the order of hundreds of nanoseconds, rather than being on the order of hundreds of microseconds, which is common in prior track change systems. This reduction in delay translates directly into higher data throughput.

It should be noted that while microcontroller 28 is "waiting" of for certain signals, it may be performing other disc drive operations. However, while microcontroller 28 must still respond to an end-of-track condition, microcontroller 28 merely has to respond prior to the completion of the positioning of the head by servo positioning system 30, rather than prior to the beginning of the servo positioning, as in system 26'. Similarly, microcontroller 28 must still respond to the SERVO COMPLETE condition, but must only do so prior to the completion of the data transfer on the current track, rather than prior to the beginning of the data transfer on that track. Therefore, the activity of microcontroller 28 occurs in parallel with either servo movement or data transfer resulting in higher data throughput.

Although the present invention has been described with reference to preferred embodiments, workers skilled in the art will recognize that changes may be made in form and detail without departing from the spirit and scope of the invention.

What is claimed is:

1. An apparatus for controlling movement of a head over tracks on a disc in a disc drive, the apparatus comprising:
    a servo positioner, coupled to the head, for positioning the head over a desired track indicated by a destination signal provided to the servo positioner and for providing a servo complete signal indicating that the head is over the desired track;
    a sector indicating circuit providing a sector signal when the head is over a desired sector on the desired track;
    a microcontroller, coupled to the servo positioner, providing the destination signal to the servo positioner;
    a formatter, coupled to the head, for transferring data to and from the desired track during a data transfer; and
    a track change circuit coupled to the servo positioner, the microcontroller, the sector indicating circuit and the formatter, the track change circuit providing a qualified sector signal to the formatter in response to the sector signal and the servo complete signal; and
    the microcontroller providing a start data transfer signal to the formatter while the servo positioner positions the head over the desired track, the formatter beginning the data transfer in response to receiving the qualified sector signal from the track change circuit and after receiving the start transfer signal from the microcontroller.

2. The apparatus of claim 1 wherein the microcontroller includes means for determining a next track over which the data transfer is to continue and for providing a next destination signal, indicative of the next track, to the servo positioner during transfer of data to the desired track.

3. The apparatus of claim 2 wherein the formatter includes means for determining whether the head is at an end of the desired track and for providing an end of track signal when the head is at the end of the desired track, and wherein the track change circuit provides a servo start signal to the servo positioner in response to the end of track signal provided by the formatter, the servo positioner positioning the head over the next track in response to the servo start signal and based on the next destination signal already provided by the microcontroller.

4. The apparatus of claim 3 wherein the track change circuit is coupled to the microcontroller for synchronous operation with the microcontroller.

5. An apparatus for controlling positioning of a head over tracks on a disc in a disc drive, the apparatus comprising:
    a servo positioner for positioning the head based on a destination signal indicating the destination of a current track;
    a formatter for transferring data to and from the disc and for providing a track complete signal indicating when the head is at an end of the current track;
    a sector detector providing a sector signal indicating when the head is over a desired sector of the current track;
    a controller, coupled to the formatter and the servo positioner, providing the destination signal to the servo positioner; and
    a track changer, coupled to the servo positioner, the formatter and the sector detector, providing the servo positioner with a servo start signal in response to the end of track signal and providing the formatter with a start transfer signal in response to the servo complete signal;
    wherein the controller provides the destination signal indicating a next track to which data is to be transferred while data is being transferred to the current track so that the servo positioner begins positioning the head over the next track in response to the servo start signal from the track changer.

6. The apparatus of claim 5 wherein the controller provides a transfer initiation signal to the formatter while the servo positioner is positioning the head over the next track so the formatter begins transferring data relative to the next track in response to the start transfer signal from the track changer.

7. The apparatus of claim 5 wherein the track changer comprises a communication channel, other than the controller, between the formatter and the servo positioner.

8. The apparatus of claim 7 wherein the communication channel includes means for causing the servo positioner to position the head over the next track when the head reaches the end of the current track, without requiring the controller to be interrupted after the head reaches the end of the current track.

9. The apparatus of claim 7 wherein the communication channel includes means for causing the formatter to begin transferring data relative to the next track when the head reaches the next track without requiring the controller to be interrupted after the head reaches the next track.

10. The apparatus of claim 5 wherein the track changer is coupled to the controller and synchronized with the controller.

11. The apparatus of claim 5 wherein the track changer comprises:
   a track change logic circuit formed of logic gates separate from the controller.

12. An apparatus for controlling positioning of a head over tracks on a disc in a disc drive, the apparatus comprising:
   a servo positioner for positioning the head based on a destination signal indicating the destination of a current track;
   a formatter for transferring data to and from the disc and for providing a track complete signal indicating when the head is at an end of the current track;
   a controller, coupled to the formatter and the servo positioner, providing the destination signal to the servo positioner; and
   a track changer, coupled to the servo positioner and the formatter, the track changer providing a communication channel, other than the controller, between the formatter and the servo positioner such that data transfer can begin upon the servo positioner completing positioning the head, in response to a signal from the track changer and without subsequent instructions from the controller, and such that servo positioning can begin after the formatter completes data transfer, in response to a signal from the track changer and without subsequent instructions from the controller.

13. The apparatus of claim 12 wherein the communication channel is arranged so the controller provides the servo positioner with a next track destination signal during a time when the formatter is transferring data relative to the current track, and the controller provides the formatter with a begin transfer signal during a time when the servo positioner is positioning the head over the next track, and so the servo positioner begins positioning the head over the next track in response to the track complete signal from the formatter, and so the formatter begins transferring data relative to the next track after the servo positioner provides a position complete signal indicating the head is over the next track.

14. The apparatus of claim 12 wherein the communication channel is arranged so the servo positioner begins positioning the head over the next track without waiting for the controller to be interrupted after the formatter provides the track complete signal.

15. The apparatus of claim 12 wherein the communication channel is arranged so the formatter begins transferring data relative to the next track without waiting for the controller to be interrupted after the servo positioner provides a position complete signal indicating the head is over the next track.

* * * * *